(12) United States Patent
Headrick et al.

(10) Patent No.: US 8,225,227 B2
(45) Date of Patent: Jul. 17, 2012

(54) MANAGING DISPLAY OF USER INTERFACES

(75) Inventors: Todd R. Headrick, Kirkland, WA (US); James C. Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1347 days.

(21) Appl. No.: 11/655,555

(22) Filed: Jan. 19, 2007

(65) Prior Publication Data

US 2008/0178113 A1    Jul. 24, 2008

(51) Int. Cl.
*G06F 3/048* (2006.01)

(52) U.S. Cl. ......... 715/778; 715/707; 715/744; 715/745

(58) Field of Classification Search ................ 715/778, 715/707, 744, 745
See application file for complete search history.

(56) References Cited

U.S. PATENT DOCUMENTS

| | | | |
|---|---|---|---|
| 5,396,264 A | 3/1995 | Falcone et al. | |
| 5,864,605 A * | 1/1999 | Keshav | 379/88.01 |
| 6,009,442 A * | 12/1999 | Chen et al. | 715/205 |
| 7,064,772 B1 | 6/2006 | Thompson et al. | |
| 2002/0033840 A1 | 3/2002 | Masthoff et al. | |
| 2002/0054086 A1 | 5/2002 | Van Oostenbrugge et al. | |
| 2003/0067488 A1 | 4/2003 | Rudd et al. | |
| 2003/0084401 A1 | 5/2003 | Abel et al. | |
| 2003/0222904 A1 | 12/2003 | Allor et al. | |
| 2004/0111673 A1 | 6/2004 | Bowman et al. | |
| 2004/0220943 A1 | 11/2004 | Ross et al. | |
| 2004/0250213 A1 | 12/2004 | Shalabi et al. | |
| 2005/0066280 A1 | 3/2005 | Austin et al. | |
| 2005/0076306 A1 | 4/2005 | Martin et al. | |
| 2005/0246643 A1 | 11/2005 | Gusmorino et al. | |
| 2006/0053384 A1 | 3/2006 | La Fetra, Jr. et al. | |
| 2006/0136829 A1 | 6/2006 | Abbar et al. | |
| 2006/0200771 A1 | 9/2006 | Nielsen et al. | |

FOREIGN PATENT DOCUMENTS

| | | |
|---|---|---|
| CN | 1138384 | 12/1996 |
| CN | 1451111 A | 10/2003 |
| WO | 2005-081094 A2 | 9/2005 |
| WO | 2005-081551 A2 | 9/2005 |
| WO | 2005-081551 A3 | 11/2005 |

(Continued)

OTHER PUBLICATIONS

"New High Performance Java Capabilities from Esmertec Now Available on Ttpcom Ajar Rapid Time-To-Marketand Significant Extension of Service Capabilities", Date: Feb. 3, 2006, http://www.esmertec.com/press/2006/060203_pressrelease_TTPCom_E.shtml.

(Continued)

*Primary Examiner* — Andrey Belousov

(57) ABSTRACT

Managing a display of a user interface. In one implementation, a first user interface and an option to change the first user interface to a second user interface may be displayed. A selection of the option to change the first user interface to the second user interface may be received. In response, the second user interface may be displayed. In addition, a count of the number of times the request to change the first user interface to the second user interface is received may be kept. If the count is equal to a predetermined number, an option to set the second user interface as the default user interface may be displayed. If the option to set the second user interface as the default user interface is selected, the second user interface may then be set as the default user interface.

12 Claims, 4 Drawing Sheets

FOREIGN PATENT DOCUMENTS

WO          2005-081094 A3     5/2007

OTHER PUBLICATIONS

Fine, et al. "Avoiding Average: Recording Interaction Data to Design for Specific User Groups", Date: 2004, pp. 398-401, vol. 3166/2004, Springer Berlin / Heidelberg, http://www.springerlink.com/content/drpb72tvqclrddxw/.

Fine, et al. "Informing Intelligent Environments: Creating Profiled User Interfaces", Date: 2004, pp. 15-18, ACM Press, New York, USA, http://delivery.acm.org/10.1145/1040000/1031423/p15-fine.pdf?key1=1031423&key2=6852550611&coll=GUIDE&dl=GUIDE&CFID=2981688&CFTOKEN=65842220.

Nielsen Jakob "Noncommand User Interfaces", Date:1993, http://www.useit.com/papers/noncommand.html.

International Search Report and Written Opinion for PCT/US2008/050298; issued May 23, 2008.

Chinese Voluntary Claim Amendments, Application No. 200880002627.3, dated Mar. 5, 2010, 12 pages.

Chinese First Office Action, Application No. 200880002627.3, dated Aug. 4, 2010, 12 pages.

Response to Chinese First Office Action, Application No. 200880002627.3, dated Oct. 29, 2010, 15 pages.

Chinese Second Office Action, Application No. 200880002627.3, dated Dec. 14, 2010, 11 pages.

* cited by examiner

MANAGING DISPLAY OF USER INTERFACES

BACKGROUND

Software that requires user interaction typically operates through a user interface (UI), which may include buttons, menus, dialog boxes, scroll bars and the like. UI's are typically designed for the population at large. Consequently, some UI's may be too basic for certain users having advanced knowledge. Further, typically the default UI's cannot be set by the users.

SUMMARY

Described herein are implementations of various technologies for managing a display of a user interface. In one implementation, a first user interface and an option to change the first user interface to a second user interface may be displayed. A selection of the option to change the first user interface to the second user interface may be received. In response, the second user interface may be displayed. In addition, a count of the number of times the request to change the first user interface to the second user interface is received may be kept. If the count is equal to a predetermined number, an option to set the second user interface as the default user interface may be displayed. If the option to set the second user interface as the default user interface is selected, the second user interface may then be set as the default user interface.

In another implementation, an option to select either a first user interface or a second user interface as a default user interface may be displayed. In addition, an option to keep a count of the number of times a change to a user interface is requested may be displayed. The count may be used to change the default user interface. In one implementation, an option to change the default user interface to the requested user interface may be displayed when the count is equal to a predetermined number.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

In general, one or more implementations of various technologies described herein are directed to providing a user with an option to change a user interface (UI). In one implementation, a count of the number of times a request to change the UI is tracked. After the count has reached a predetermined number, the user may be given an option to change the default UI to the UI that has been requested a predetermined number of times. Various implementations of the manner in which the UI may be modified and tracked will be described in more detail in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
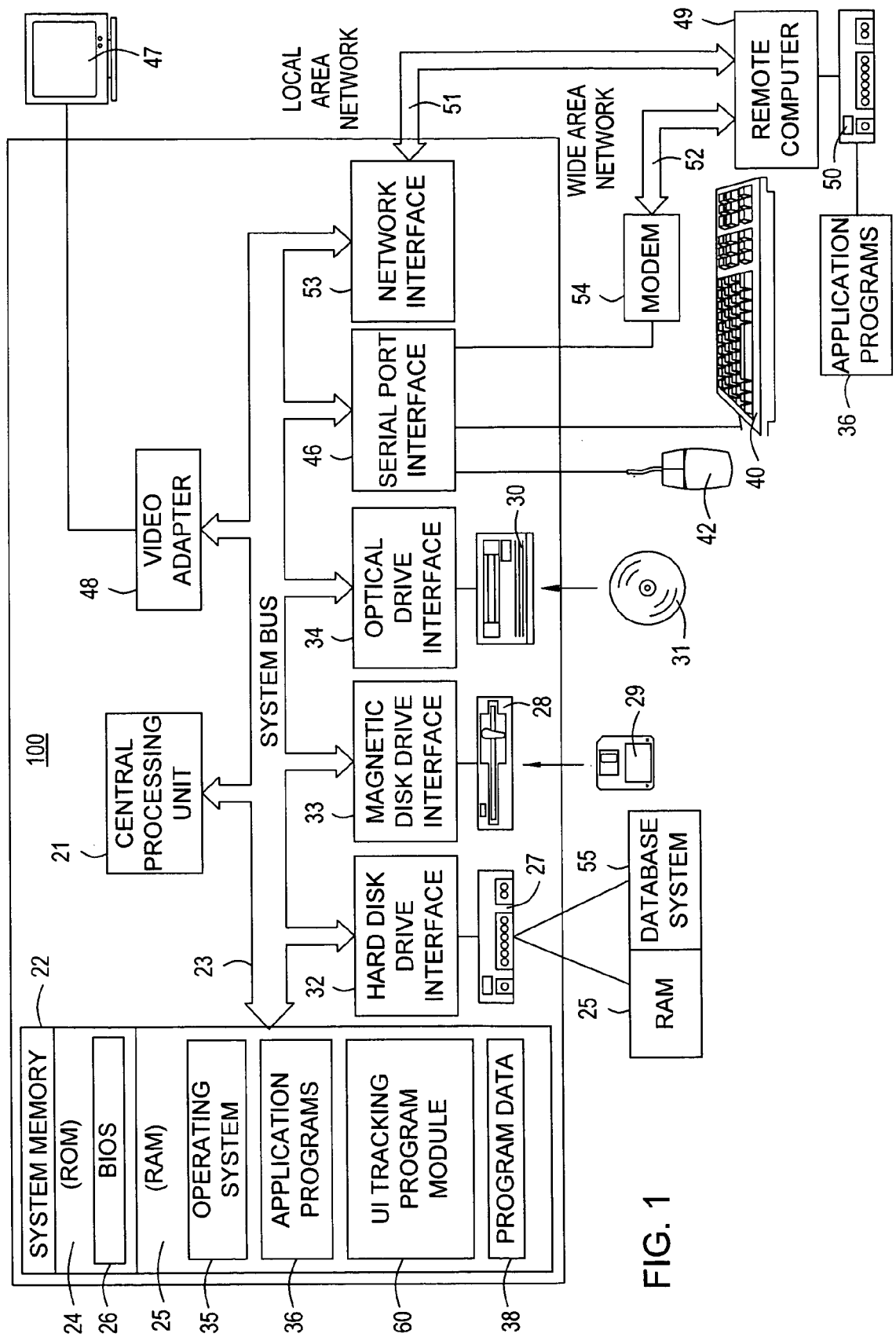
FIG. 1 illustrates a schematic diagram of a computing system in which various technologies described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

A number of program modules may be stored on the hard disk, magnetic disk 29, optical disk 31, ROM 24 or RAM 25, including an operating system 35, one or more application programs 36, a UI tracking program module 60, program data 38 and a database system 55. The operating system 35 may be any suitable operating system that may control the operation of a networked personal or server computer, such as Windows® XP, Mac OS® X, Unix-variants (e.g., Linux® and BSD®), and the like. The UI tracking program module 60 will be described in more detail with reference to FIGS. 2-5 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

Further, the computing system 100 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, the remote computer 49 may include many or all of the elements described above relative to the computing system 100. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
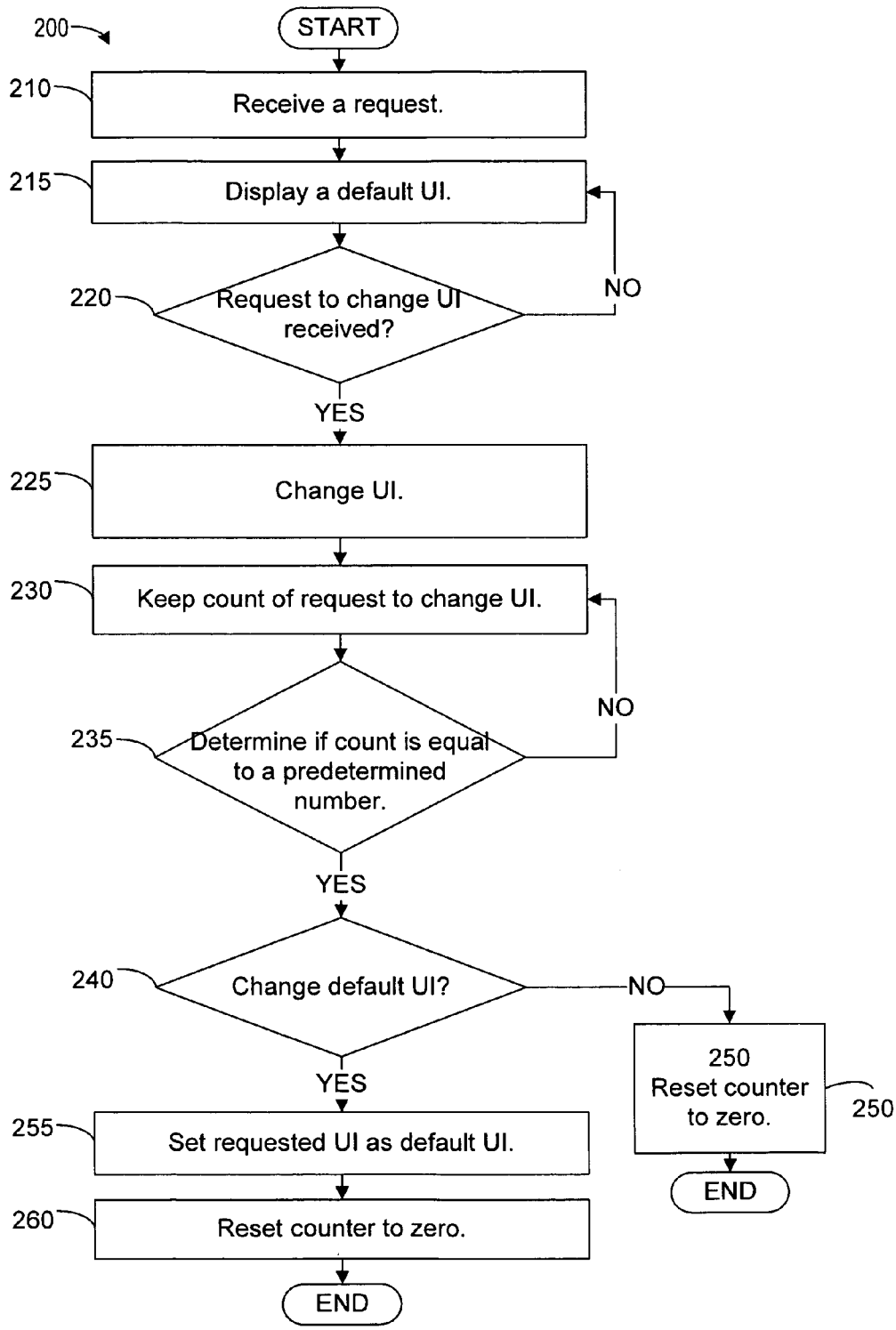
FIG. 2 illustrates a flow diagram of a method for managing the display of a UI in accordance with implementations of various technologies described herein.

FIG. 2 illustrates a flow diagram of a method 200 for managing the display of a UI in accordance with implementations of various technologies described herein. It should be understood that while the operational flow diagram of the method 200 indicates a particular order of execution of the operations, in some implementations, the operations might be executed in a different order.

At step 210, a computing system 100 may receive a request. The request may be for information, options, an action or the like. For example, a user may request information such as help on a topic, options such as the types of bullets and numbering available, or an action such as adding a new user to the computing system 100.

At step 215, the computing system 100 may display a response to the request through a default UI. As such, the UI may provide information and/or options, input fields and the like. For example, the UI may provide help information on the requested topic, options for bullets and numbering or input fields for entering new user information.

Figure 3:
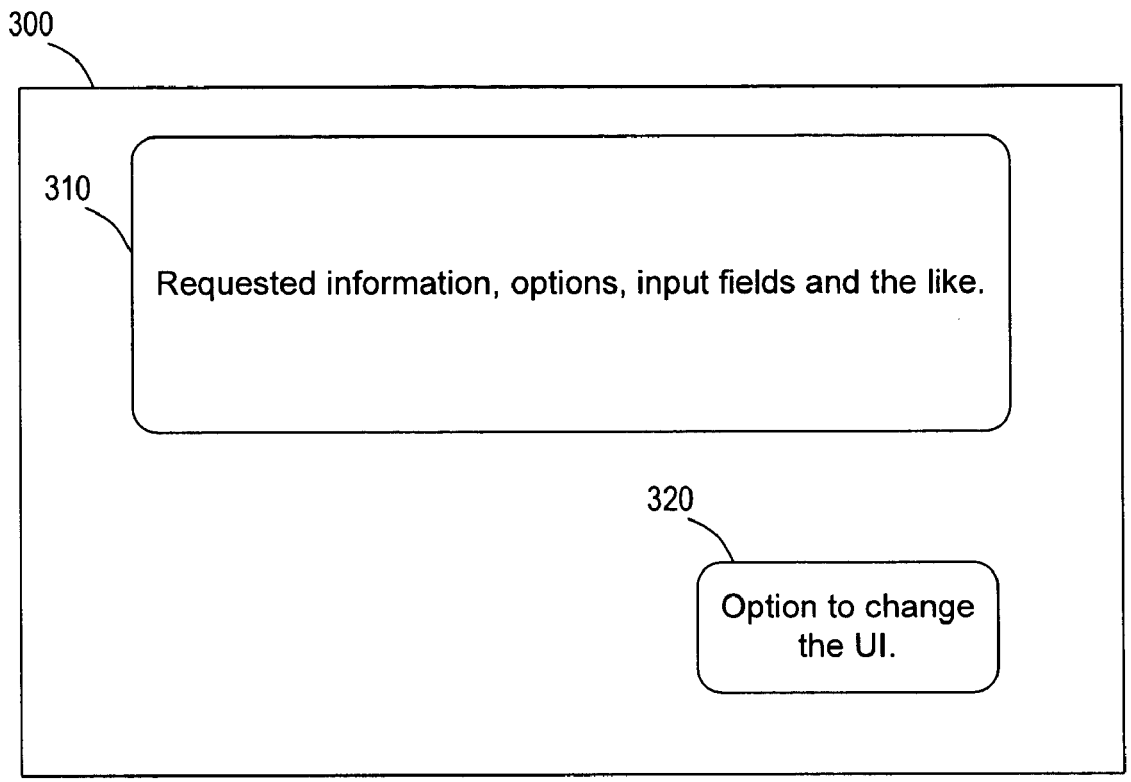
FIG. 3 illustrates a UI that may be displayed in response to a user request in accordance with implementations of various technologies described herein.

FIG. 3 illustrates a UI 300 that may be displayed in response to a user request in connection with implementations of various technologies described herein. In addition to the requested information, options, input fields and the like 310, the UI 300 may also include an option to change the UI 320. The option to change the UI 320 may be configured to change the UI displayed to the user. In one implementation, the option to change the UI 320 may be a button configured to display a different UI offering further customization, additional information, advanced options and the like. In another implementation, the option to change the UI 320 may be a button configured to provide more basic information, simpler options and the like. Although the option to change the UI is described with reference to a button, it should be understood that in some implementations, the option to change the UI may be accomplished through other means, such as a pull down menu, a hyperlink or the like.

Figure 4A:
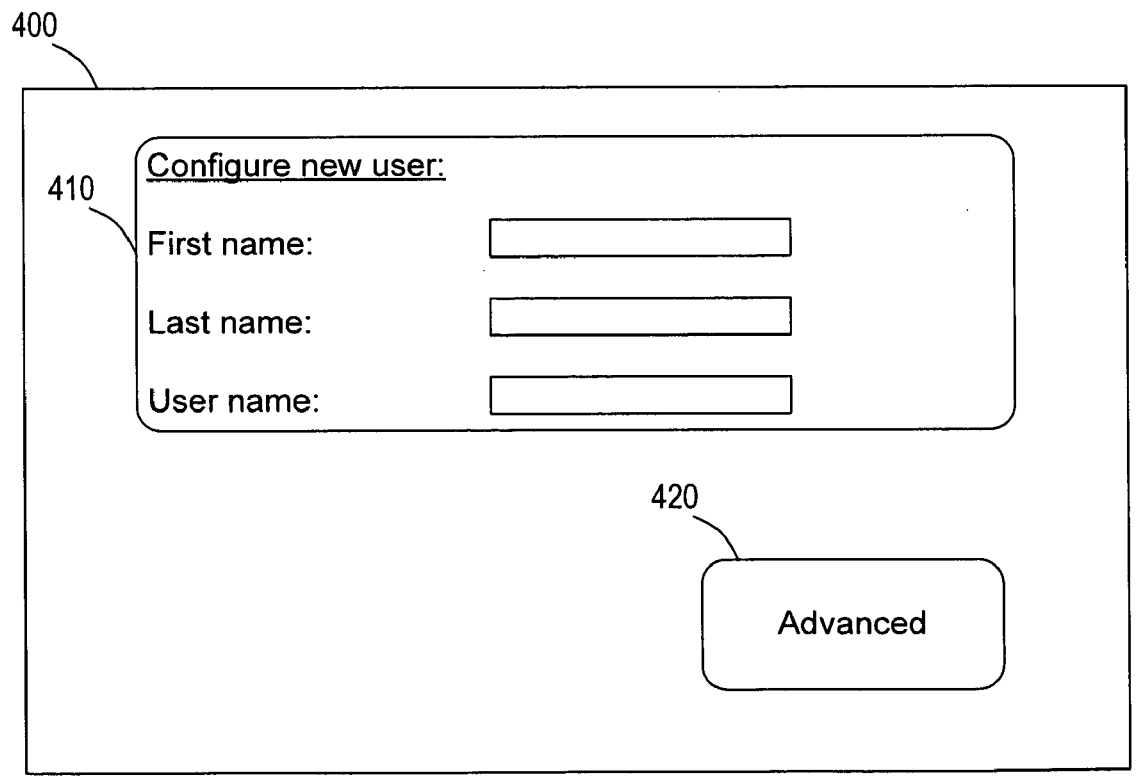
FIG. 4A-B illustrate an example of a UI that may be displayed in response to a request to add a new user to the computing system in accordance with implementations of various technologies described herein.

FIG. 4A illustrates an example in which an "Add New User" UI 400 may be displayed in response to a request to add a new user to the computing system 100. In addition to the input fields 410, an "Advanced" button 420 may be displayed. The "Advanced" button 420 may be configured to provide a more advanced UI for adding new users and will be described in more detail in the following paragraphs.

Figure 4B:
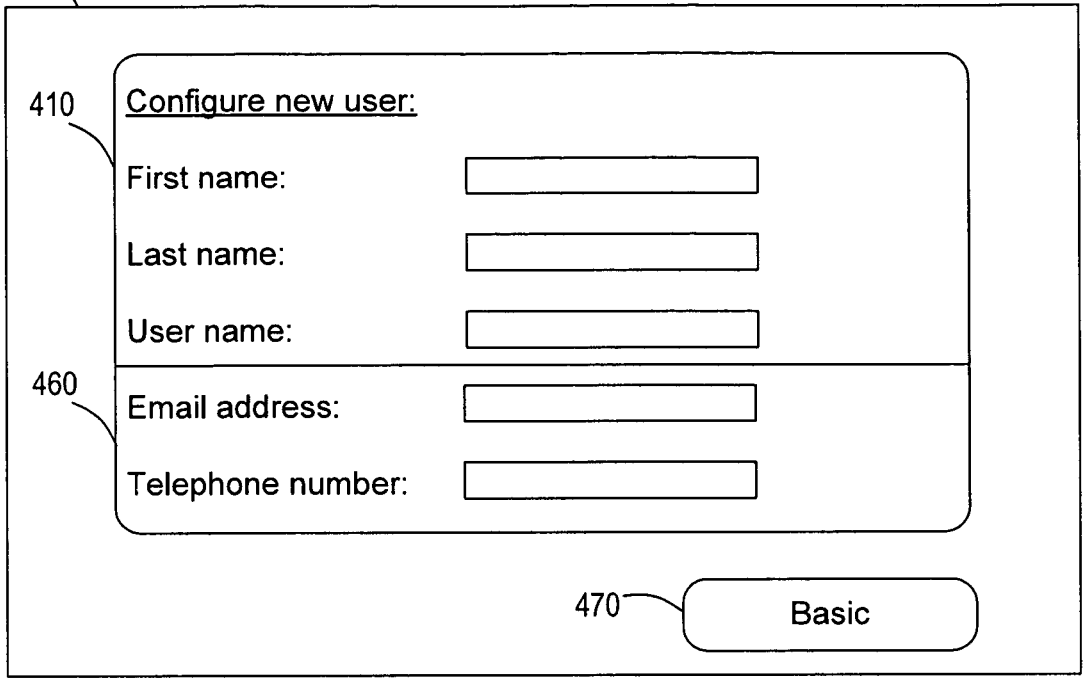

At step 220, a determination is made as to whether a request to change the UI has been received, e.g., whether a selection of the "Advanced" button 420 has been received. If no request to change the UI is received, then the default UI continues to be displayed to the user. However, if a request to change the UI is received, then the UI may be changed based on the request (step 225). For example, in response to the "Advanced" button being selected by the user, an "Advanced Add New User" UI 450 may be displayed to the user, as illustrated in FIG. 4B. In addition to the original input fields 410, the "Advanced Add New User" UI 450 may provide the user with advanced input fields 460. The "Advanced Add New User" UI 450 may also display a "Basic" button 470 to provide the user with an option to change the UI back to the "Add New User" UI 400. In this manner, if the "Basic" button 470 is selected, the UI may revert back to the "Add New User" UI 400, which displays the original information shown in FIG. 4A.

At step 230, the UI tracking program module 60 may keep a count of the number of times a request to change the UI is received. For example, the UI tracking program module 60 may keep a count of the number of times the "Advanced" button 420 on the "Add New User" UI 400 is selected.

At step 235, the UI tracking program module 60 may compare the count to a predetermined number, e.g., five. If the count is less than the pre-determined number, processing may return to step 230 and leave the default UI unchanged.

However, if the count is equal to the predetermined number, then the UI tracking program module 60 may provide the user with an option to change the default UI to the requested UI (step 240). For example, if the "Advanced" button 420 on the "Add New User" UI 400 has been selected a predetermined number of times to change to the "Advanced Add New User" UI 450, the UI tracking program module 60 may provide the user with an option to change the default UI to the "Advanced Add New User" UI 450 from the "Add New User" UI 400.

If the response to the option to change the default UI is in the negative, i.e., the user does not want to change the default UI, then the UI tracking program module 60 may reset the counter back to zero (step 250).

If the response to the option to change the default UI is in the affirmative, i.e., the user wants to change the default UI, then the UI tracking program module 60 may set the requested UI as the default UI (step 255). For example, if the response to the option to change the default UI to the "Advanced Add New User" UI 450 is in the affirmative, the UI tracking program module 60 may set the "Advanced Add New User" UI 450 as the default UI. As a result of this change, if the computing system 100 receives a request at step 210 to add a new user, then at step 215 the "Advanced Add New User" UI 450 of FIG. 4B may be displayed rather than the "Add New User" UI 400 of FIG. 4A.

At step 260, the UI tracking program module 60 may reset the counter to zero. As noted above, the new default UI may have a button to provide the user with the option to change to a different UI. After receiving a request to change to a different UI a predetermined number of times, the UI tracking program module 60 may provide the user with an option to change the default UI to the requested UI. For example, after changing the default UI to the "Advanced Add New User" UI 450, if the "Basic" button 470 is selected a predetermined number of times, the UI tracking program module 60 may provide the user with an option to change the default UI back to the "Add New User" UI 400.

As described above, the UI tracking program module 60 may be configured to track requests for changes to the UI's on an individual UI level. As such, the UI tracking program module 60 may have a separate count of requests to change the UI for each UI associated with a piece of software. In this manner, the default UI for each piece of software may be individually managed.

In one implementation, the UI tracking program module 60 may be configured to track requests to use certain functions or tools. In this implementation, at step 240, the UI tracking program module 60 may query the user as to whether the repeatedly selected function or tool should be added to the default toolbar.

In another implementation, the computing system may have all UI's classified, for example, as basic or advanced UI's. As such, the UI tracking program module 60 may be configured to track requests for changes to the UI's at a system wide level such that as a class of UI's are frequently selected in any area, the user may be asked if the computing system default UI's should be changed to that class of UI's. In this manner, classes of default UI's may be managed as a group.

Figure 5:
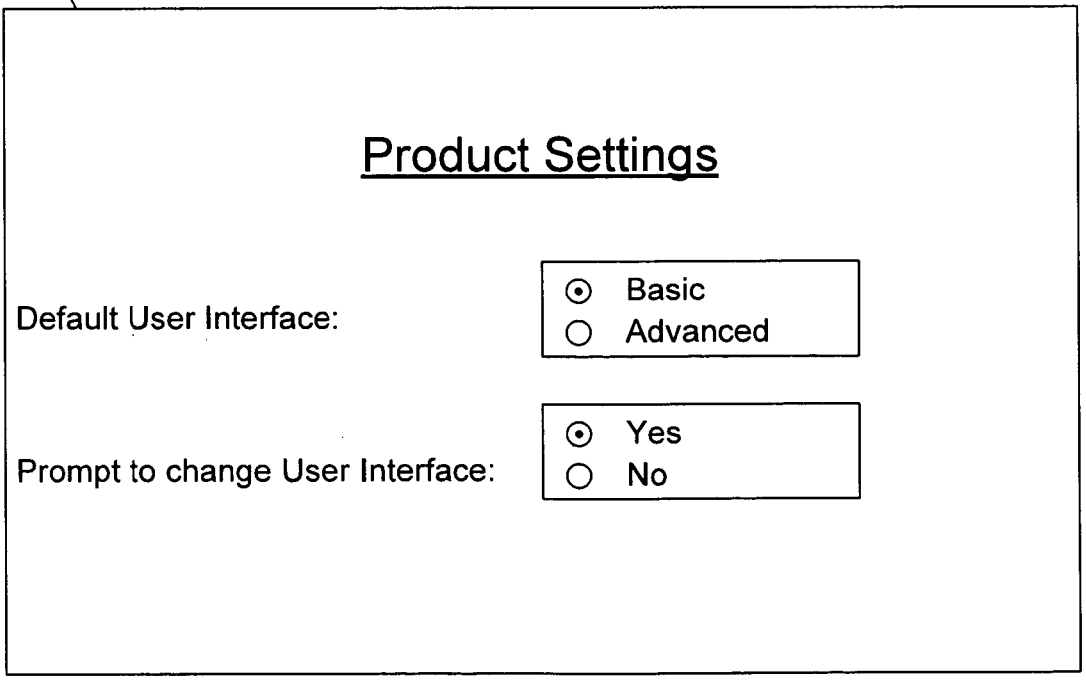
FIG. 5 illustrates a UI for setting the default UI and for activating the UI tracking program module in accordance with implementations of various technologies described herein.

FIG. 5 illustrates a UI 500 for setting the default UI and for activating the UI tracking program module 60 in accordance with implementations of various technologies described herein. At box 510, the default settings UI 500 may provide the user with the option to select a "Basic" UI or an "Advanced" UI. At box 520, the default settings UI 500 may also provide the user with the option to activate the UI tracking program module 60. Although the default settings for the UI are described with reference to a UI, it should be understood that in some implementations, the UI default settings may be modified through other means, such as a pull down menu, hyperlinks and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a display of a user interface, comprising:
   displaying as a user interface a first user interface to a user, wherein the first user interface is classified in a first class of user interfaces;
   displaying an option to the user to change the user interface to a second user interface, wherein the second user interface is classified in a second class of user interfaces;
   receiving a selection from the user of the option to change the user interface to the second user interface;
   displaying the second user interface to the user in response to receiving the selection of the option to change the user interface to the second user interface;
   keeping a count of a number of times the option to change the user interface to the second user interface is selected by the user;
   displaying an option to the user to set the second user interface as a default user interface if the count is equal to a predetermined number; and
   setting the second user interface as the default user interface if a selection of the option to set the second user interface as the default user interface is received from the user, wherein selection of the option to set the second user interface as the default user interface causes default user interfaces of a computing system to be changed to the second class of user interfaces.

2. The method of claim 1, further comprising setting the count to zero once the second user interface has been set as the default user interface.

3. The method of claim 1, further comprising setting the count to zero if a selection of the option to set the second user interface as the default user interface is not received.

4. The method of claim 1, further comprising:
   providing an option to change the user interface to the first user interface.

5. The method of claim 4, further comprising:
   receiving a request from the user to change the user interface to the first user interface; and
   keeping a count of a number of times the request to change the user interface to the first user interface is received.

6. The method of claim 5, further comprising providing an option to the user to set the first user interface as the default user interface, if the count of the number of times the request to change the user interface to the first user interface is equal to the predetermined number.

7. A computer-readable medium, the computer-readable medium not consisting of a propagating signal, the computer-readable medium having stored thereon computer-executable instructions which, when executed by a computer, cause the computer to:
   display as a user interface a first user interface to a user, wherein the first user interface is classified in a first class of user interfaces;
   display an option to the user to change the user interface to a second user interface, wherein the second user interface is classified in a second class of user interfaces;
   receive a selection from the user of the option to change the user interface to the second user interface;
   display the second user interface to the user in response to receiving the selection of the option to change the user interface to the second user interface;
   keep a count of a number of times the option to change the user interface to the second user interface is selected by the user;
   display an option to the user to set the second user interface as a default user interface if the count is equal to a predetermined number; and
   set the second user interface as the default user interface if a selection of the option to set the second user interface as the default user interface is received from the user, wherein selection of the option to set the second user interface as the default user interface causes default user interfaces of a computing system to be changed to the second class of user interfaces.

8. The computer-readable medium of claim 7, further comprising computer-executable instructions which, when executed by a computer, cause the computer to provide an option in the second user interface for the user to change the user interface to the first interface.

9. The computer-readable medium of claim 8, further comprising computer-executable instructions which, when executed by a computer, cause the computer to keep a count of a number of times the option to change the user interface to the first user interface is selected by the user.

10. The computer-readable medium of claim 9, further comprising computer-executable instructions which, when executed by a computer, cause the computer to display an option to the user to set the first user interface as the default user interface, if the count of the number of times the option to change the user interface to the first user interface is equal to the predetermined number.

11. The computer-readable medium of claim 7, further comprising computer-executable instructions which, when executed by a computer, cause the computer to set the count to zero if a selection of the option to set the second user interface as the default user interface is not received from the user.

12. The computer-readable medium of claim 7, wherein the second user interface comprises more information than the first user interface.

* * * * *